Dec. 17, 1935.　　　C. W. DAVIS　　　2,024,818
MACHINE FOR GLAZING GLASSWARE
Filed Feb. 27, 1931　　　2 Sheets-Sheet 1

Cortland W. Davis,
INVENTOR.

BY Thomas G. Steward,
ATTORNEY.

Dec. 17, 1935. C. W. DAVIS 2,024,818
MACHINE FOR GLAZING GLASSWARE
Filed Feb. 27, 1931 2 Sheets-Sheet 2
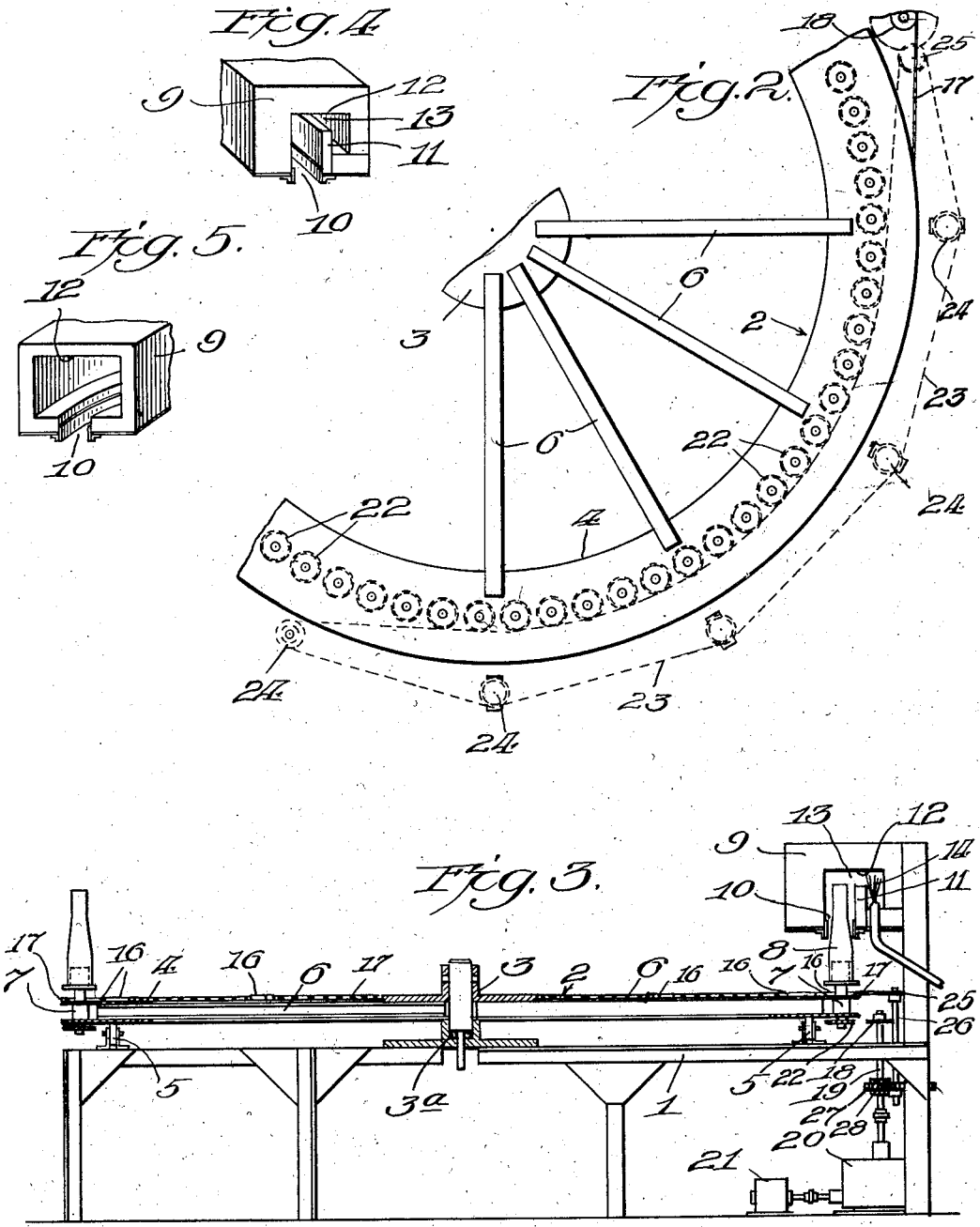
Cortland W. Davis,
INVENTOR,
BY Thomas G. Steward,
ATTORNEY.

Patented Dec. 17, 1935

2,024,818

UNITED STATES PATENT OFFICE 2,024,818

MACHINE FOR GLAZING GLASSWARE

Cortland W. Davis, Alexandria, Ind., assignor to The Mantle Lamp Company of America, Chicago, Ill., a corporation of Illinois Application February 27, 1931, Serial No. 518,691

10 Claims. (Cl. 49—58)

The invention relates to machines for glazing glassware and, broadly considered, involves a machine wherein glassware may be glazed without leaving in the finished product undue molecular strains and wherein economy in the use of fuel is effectuated.

Glazing of glassware, as heretofore practiced, involves a direct heating of the glassware by the application of open fires which are regulated and positioned so that the part of the glassware to be glazed is heated to the highest temperature, the intensity of the fires being so regulated and their positions being so adjusted that sufficient heat will be transferred to that part to melt it and effect the glazing.

Glassware, when subjected to heat, expands, and it is therefore necessary that portions of the glassware which are adjacent to the portion to be glazed shall be incrementally heated and expanded at the time of glazing, so that there will be developed no such strains within the glass as might, at the time of glazing or some subsequent time, result in the breaking of the glassware. Successful glazing, therefore, presents the problem of heating portions of glassware adjacent to and at the point of glazing in such a manner that the development of strains within the glass may be avoided. An uniform heat gradient must be developed between the point of glazing and remote portions of the glassware. Therefore, additional fires are commonly employed in order to heat the portions which are not to be glazed. The glazing process, as heretofore practiced, is frequently carried out by gradually heating the glassware with open fires, and then directing a second short, pointed and intense flame at the point to be glazed, after which, and while the glassware is being removed from the point of glazing, the heating fires are gradually reduced. These operations are usually carried out by moving the glassware to and from stationary flames.

This usual method of glazing, wherein open flames are used for heating the glassware, is objectionable because of the difficulty of so regulating the intensity and length of the open flames that a uniform heat gradient, between the point to be glazed and remote cool sections of the glass, will be developed.

The second defect in the usual method of glazing, consists of the termal inefficiency of the process, it being difficult to transfer heat from an open flame to glassware efficiently and without injury to the glass.

The invention will best be understood if reference be had to the accompanying drawings, in which—

Figure 2 is a fragmentary view of a movable part of the apparatus, as seen from below;

Figure 3 is a sectional view of the apparatus taken on the line 3—3 of Figure 1, parts thereof being shown in elevation, and Figures 4 and 5 are views showing details of the apparatus.

Figure 1:
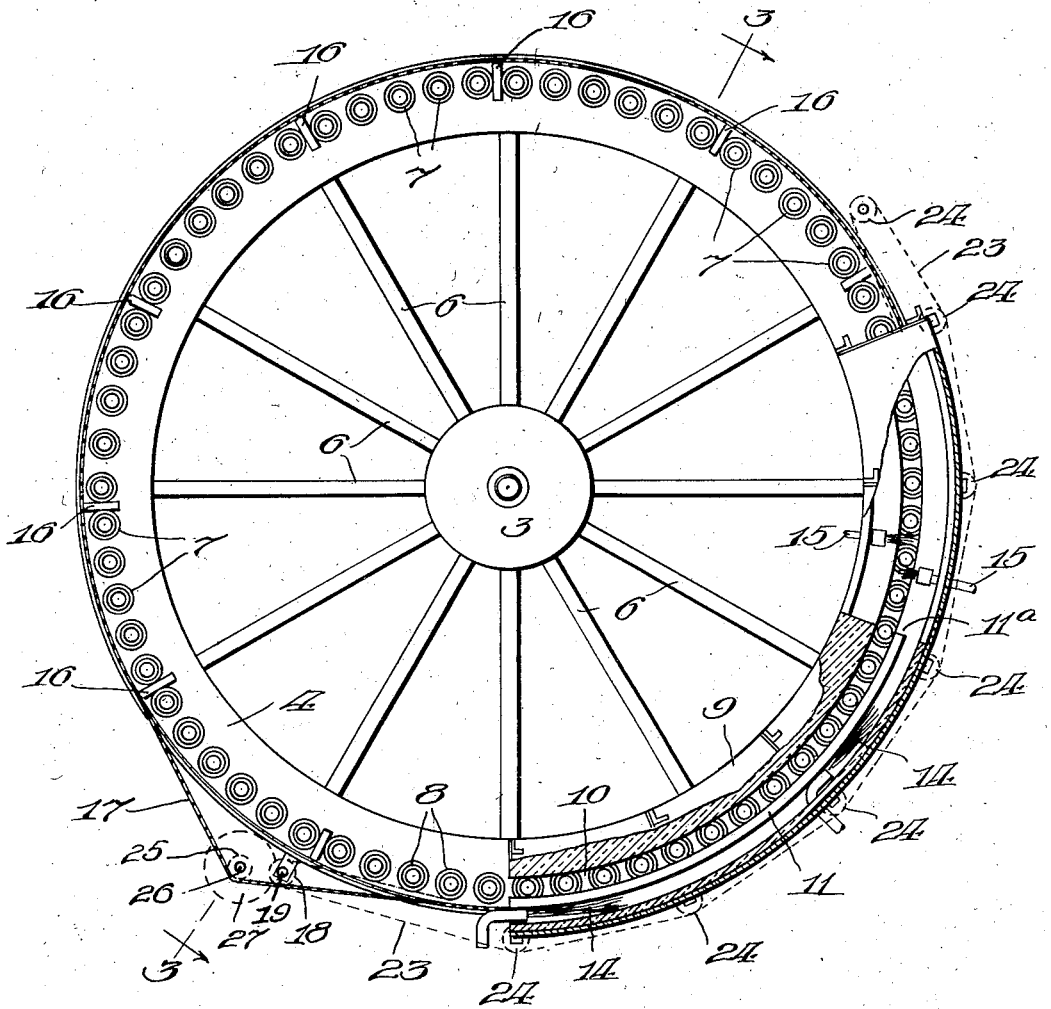
Figure 1 is a plan view of the apparatus, parts thereof being broken away to reveal underlying elements.

Referring to the drawings, 1 is a base on which the operative parts of the apparatus are mounted, and 2 is a turntable mounted on said base and having a hub 3 resting on a ball bearing 3a carried by said base 1, and also having a wide horizontal rim 4 sustained by rollers 5 which are disposed at intervals around the upper surface of said base, said hub 3 and said rim 4 being connected by radial spokes 6.

Upstanding chimney-holding chucks 7 are arranged around the entire circumference of the rim 4, with each of which chucks the lower end of a glass chimney 8 may telescope in order to accurately determine the positions of that chimney relative to the heated and stationary glazing elements of the apparatus.

Above, and at one side of the turn-table 2, is a preferably heat-insulated and curved refractory tunnel 9 which is provided with a slot 10 through which the upper end of a chimney 8 may freely extend, and, extending from the initial end of this tunnel 9 to a point which is about midway its length, is an upwardly-extending partition 11 terminating below the upper surface 12 of the cavity of said tunnel, so as to leave a passage 13 through which products of combustion, produced by a flame or flames disposed behind said partition 11, will flow into contact with the upper end of a chimney 8. This flame 14 also heats the refractory mass of the tunnel 9, thus conserving heat which, otherwise, would be wasted. Hence, the upper end of each chimney, as it moves in proximity to the partition 11 of said tunnel 9, will be preliminarily heated, not only by the waste products of the flame 14, but by the radiant heat of said refractory mass. This flame 14 should be so regulated that the rough glass of a chimney will be heated to a point just short of its fusion temperature, the temperature of fusion being later produced by other controlled means.

Beyond the terminal 11a of the partition 11 are regulable pin-fire burners 15, only one of which, however, may be required. These burners supply just enough heat to raise the preliminarily-heated rough glass at the top of a chimney to the fusion point, and, since the flames of these burners are very small and may and do accurately impinge upon said preheated rough glass, loss of heat is negligible.

The speed of a chimney, or a series of chimneys, while passing through the tunnel 9, should be such that the preliminary heating of the rough glass to a temperature approximating, but not attaining its fusing point, will be effected, and that said preheating will be so slowly accomplished as to give time for the conduction of heat through the glass to thereby establish the heat gradient, hereinbefore mentioned. Furthermore, each chimney should be rotated while passing through the tunnel 9, so that all parts of its circumference will be uniformly heated. For these reasons the apparatus is provided with an automatic means for rotating the chucks 7 and the turn-table 2 at such relative speeds as will effectuate these results.

The periphery of the turntable 2 is provided with a series of outstanding teeth 16 engaging links of an endless chain 17 that is driven by a sprocket 25, while sprockets 22 on the chucks 7 are engaged by a chain 23 that is driven by a sprocket 18 and passes over idlers 24.

The sprocket 18 is carried by a shaft 19, said shaft 19 being actuated by a speed reducer 20 that is driven by an electrical motor 21, and the sprocket 25 is carried by a shaft 26 having at its lower end a relatively large gear 27 which meshes with a pinion 28 disposed on the shaft 19.

The two chains, 17 and 23, are thus driven at different speeds, this result being due to the relative sizes of the gear 27 and the pinion 28, whereby the shaft 26 rotates less rapidly than the shaft 19. The chain 23, it will be observed, will not revolve the chucks 7 until the chimneys are about to enter the tunnel 9.

When the apparatus is to be operated, the preheating flames 14 are started and maintained for a time sufficient to fully heat the tunnel 9, whereupon chimneys are placed on the chucks 7. The glazing flame burners are then lighted and the motor 21 is started. The turn-table 2 moving at a relatively low speed carries the chimneys with it until their upper ends project upward through the slot 10 and enter the tunnel 9 wherein said upper ends are preheated, as hereinbefore described, after which the rough ends of the chimneys are subjected to the fusing and glazing action of the burner 15. The chimneys then pass through the unheated end of the tunnel 9 wherein they are sufficiently cooled to admit of handling.

An important characteristic of the invention is the graduation of the initial heat applied to a chimney at its upper end, the rough glass thereat being highly heated, not only by the products emanating from the flame 14, but also by the radiant heat propagated by the proximate refractory walls of the tunnel 9, whereby lower and successive portions of the chimney are heated only by said radiant heat and by heat conducted downward through the glass.

Having thus described my invention, what I claim is:

1. A machine for glazing glassware, including a refractory mass of material, means disposed at one side thereof for heating said mass, means for sustaining a glass article which is to be glazed in proximity to and at the other side of said refractory mass, and means for heating and fusing and thereby glazing a selected part of said glass article.

2. A machine for glazing glassware, including a refractory mass of material, means disposed at one side thereof for heating said mass, means for sustaining a glass article which is to be glazed in proximity to and at the other side of said refractory mass, and a pinfire burner for heating and fusing and thereby glazing a selected part of said glass article.

3. A tunnel for glassware that is to be glazed, having flame-heated refractory means for preheating articles disposed in the initial end thereof, means for heating and fusing the selected part of a glass article, and an unheated terminal in which said selected part may be cooled.

4. A machine for glazing glassware, including a slotted tunnel, flame-heated refractory means associated with said tunnel for preheating glass articles, means for fusing a selected part of each of said glass articles, a carrier having rotary chucks thereon for receiving said glass articles, means for rotating said chucks, and means for moving said carrier.

5. A machine for glazing glassware, including a slotted tunnel, flame-heated refractory means associated with said tunnel for preheating glass articles, means for fusing a selected part of each of said glass articles, a turn table having rotary chucks thereon for receiving said glass articles, means for rotating said chucks, and means for moving said turn table.

6. A machine for glazing articles of glassware including a preheating chamber having a thermally-stable refractory heat-radiating mass therein, a source of heat for heating said refractory mass to a temperature approximating the fusion point of the glass article, means adjacent said refractory mass for sustaining articles that are to be glazed, and an additional source of heat, disposed beyond said refractory mass, for fusing limited and desired surfaces of said articles after they have been preheated by the radiant heat of said refractory mass.

7. A machine for glazing glassware, including a heat-radiating refractory mass for preheating articles that are to be glazed, a source of heat for directly heating said refractory mass, means adjacent said refractory mass for sustaining articles that are to be glazed, and an additional source of heat disposed beyond said refractory mass for fusing limited and desired surfaces of said articles after they have been preheated by the radiant heat of said refractory mass.

8. A machine for glazing glassware, including a pre-heating refractory tunnel, means for moving the glassware through said tunnel, means for applying heat indirectly to the glassware to preheat the same to a desired temperature, and means for applying a glazing temperature directly to the preheated part of the glassware to be glazed.

9. A machine for glazing glassware, including a heat-insulated pre-heating refractory tunnel, means for moving the glassware through said tunnel, means for applying heat indirectly to the glassware to preheat the same to a desired temperature, and means for applying a glazing temperature directly to the preheated part of the glassware to be glazed.

10. The process of glazing, which includes subjecting the article to be glazed to a hot medium maintained at a temperature just short of that at which said article softens and sags, until the temperatures of said article and said heating medium are substantially equalized, and then heating to the fusion point such part of said article as is to be glazed.

CORTLAND W. DAVIS.